United States Patent [19]

Tempel

[11] Patent Number: 5,337,792

[45] Date of Patent: Aug. 16, 1994

[54] PROTECTIVE COVER FOR PIPE END

[75] Inventor: Lorne F. Tempel, Regina, Canada

[73] Assignee: IPSCO Enterprises Inc., Wilmington, Del.

[21] Appl. No.: 7,082

[22] Filed: Jan. 21, 1993

[51] Int. Cl.⁵ .......................................... B65D 59/06
[52] U.S. Cl. ................................. 138/96 R; 138/89.4
[58] Field of Search ................. 138/96 R, 89.1, 89.2, 138/89.3, 89.4; 229/5.5, 5.8; 285/901, 345, 203

[56] References Cited

U.S. PATENT DOCUMENTS

| | | | |
|---|---|---|---|
| 154,724 | 9/1874 | Stevens | 229/5.5 |
| 952,197 | 3/1910 | Hussey | 229/5.5 |
| 957,267 | 5/1910 | Sowell | 229/5.5 |
| 1,866,036 | 7/1932 | Hartman et al. | 229/5.5 |
| 1,955,865 | 4/1934 | Wellman | 229/5.5 |
| 1,980,364 | 11/1934 | Thomas | 138/96 R |
| 2,075,465 | 3/1937 | Powell | 229/5.5 |
| 2,139,626 | 12/1938 | Sidebotham | 229/5.5 |
| 2,341,374 | 2/1944 | Gardner | 229/5.5 |
| 2,557,576 | 6/1951 | Simmons | 229/5.5 |
| 2,737,205 | 6/1956 | Stringfield . | |
| 2,740,572 | 4/1956 | Welshenbach | 229/5.5 |
| 3,078,879 | 2/1963 | Mallard . | |
| 3,744,528 | 7/1973 | Vestal . | |
| 4,630,646 | 12/1986 | Koehle . | |
| 4,915,137 | 4/1990 | Hall . | |
| 4,957,141 | 9/1990 | Dreyfuss . | |
| 5,074,336 | 12/1991 | Black . | |

*Primary Examiner*—Timothy F. Simone
*Assistant Examiner*—James F. Hook
*Attorney, Agent, or Firm*—Robert H. Barrigar

[57] ABSTRACT

A weather protector for the end of a pipe section, e.g. for use in a pipeline, tends to prevent the ingress of snow and rain into the interior of the pipe. The weather protector is made from a generally circular blank having peripheral tabs, a few of which are widely circumferentially spaced and are appreciably longer than the remaining tabs and extend over the edge of the pipe end. The weather protector is placed in the interior or the pipe, the tabs forming a substantially continuous cylindrical rim portion that engages the interior cylindrical surface of the pipe. The longer tabs position the weather protector in the interior of the pipe by overlapping the pipe end to prevent the weather protector from being pushed further into the interior of the pipe. The spacing between any neighbouring pair of longer tabs is sufficient that a pipe gripping element may grip the edge of the pipe without encountering any of the tabs so that the weather protector may stay in place at the pipe-end even though it has been handled repeatedly. The outermost circular surface of the weather protector is preferably water repellant. A small hole may be provided in the circular area to relieve pressure differentials between the interior and the exterior of the pipe. The exterior tab ends are preferably tapered to reduce wind drag during transit. The weather protector is preferably made of cardboard or similar disposable biodegradable material.

28 Claims, 2 Drawing Sheets

PROTECTIVE COVER FOR PIPE END

FIELD OF THE INVENTION

This invention relates to a weather protector for a pipe section. The invention is particularly suitable for relatively large diameter pipe sections of the sort that are welded together to form a pipeline.

BACKGROUND OF THE INVENTION

To form a pipe line, pipe sections (sometimes for convenience referred to herein simply as "pipe") are welded together. The welding operation must be conducted in relatively dry conditions; otherwise oxygen present in the water at the welding site will tend to enter the weld spot, thereby weakening the weld.

When the welding is done in the summer months or in areas of favourable client, any accumulated rainwater can normally be fairly readily drained out of a pipe section and the pipe section welded in place without a serious problem, but in the winter months, especially in colder climates, there is a tendency for snow to blow into pipe sections and accumulate; sometimes a person has to enter the pipe section with a broom and sweep it out in order to get rid of the snow. It is therefore desirable to have a weather protector at each end of a pipe section to prevent snow in particular and also rain and debris from blowing into the pipe section and accumulating there.

It is, of course, easy enough to provide a weather protector—one could simply take plastic sheeting, wrap it around the end of the pipe section, and tie a string around the end of the pipe section to hold the sheeting in place. More elegant solutions than this to the problem have been proposed in the past. Among them are the following:

Vestal in U.S. Pat. No. 3,744,528 issued 10 Jul., 1973 discloses a pipe-end protector comprising a double-wall sleeve that fits over the end of the pipe and terminates in the interior of the pipe, recessed from the pipe-end, in a circular barrier. This type of pipe-end weather protector is completely satisfactory to its purpose of keeping snow, rain and debris out of the pipe. However, it suffers from the significant disadvantage that when the pipe is handled from time to time (stacking in a storage yard; loading onto a transport vehicle; unloading from the transport vehicle; moving from a depository to the site at which it is to be welded, etc.) the weather protector may be damaged or dislodged. The reason for this is that pipe-gripping machinery typically includes a gripping element that grips the pipe section at its end. This gripping element therefore can easily damage Vestal's closure element and may dislodge it. Vestal proposes also that his weather protector be made of plastic, which is not readily biodegradable. Further, Vestal relies upon some flexibility of the plastic barrier portion of his weather protector to move like a diaphragm to accommodate pressure differentials between the interior and exterior of the pipe section. This may not be sufficient to accommodate sudden pressure changes; the plastic could burst.

Mallard in U.S. Pat. No. 3,078,879 issued 26 Feb., 1963 discloses a weather protector for a pipe end that is insertable into the pipe end and may remain in place inset from the pipe end so that pipe gripping tools do not come into contact with the weather protector. Mallard thus avoids a significant disadvantage in the Vestal design. However, because there is no portion of the Mallard weather protector that extends outwardly to the edge of the pipe, it is difficult to place the weather protector in the proper place within the pipe and equally difficult to dislodge it and remove it prior to welding. Further, Mallard, in order to maintain the weather protector in gripping contact with the interior walls of the pipe, relies upon a separate band and requires a special tool to install the weather protector and the band in place within the pipe section. So Mallard's design is both awkward to use and expensive. Mallard also proposes the use of polyethylene plastic for use as the material of which the weather protector is manufactured, giving rise to the same problem of poor biodegradability from which Vestal also suffered. Polyethylene may also become unsatisfactorily brittle in very cold weather.

Even more elaborate and expensive pipe-end closures have been devised such as those illustrated in U.S. Pat. No. 2,737,205 (Stringfield - 6 Mar., 1956); U.S. Pat. No. 5,074,336 (Black - 24 Dec., 1991); U.S. Pat. No. 4,957,141 (Dreyfuss - 18 Sep., 1990) and U.S. Pat. No. 4,915,137 (Hall - 10 Apr., 1990). All of these present complex and expensive structures that suffer from some or all of the disadvantages mentioned previously. None is conveniently usable in conjunction with conventional pipe-end gripping tools.

SUMMARY OF THE INVENTION

The weather protector according to the present invention avoids the various problems mentioned above by providing a relatively simple inexpensive biodegradable weather protector for the end of a pipe section that can be made as a single stamped or precut blank or may optionally have an additional water repellant layer laminated to the blank. Installed in the pipe, the foregoing structure constitutes a weather resistant barrier.

Like many of the weather protector designs known in the prior art, the barrier portion of the weather protector according to the present invention is inset within the exposed end of the pipe section so that when the pipe section is gripped, the gripping tool does not make contact with the barrier. However, unlike the previous designs, the weather protector according to the present invention includes, preferably integral with the blank, an array of spaced tabs that protrude, when the weather protector is installed in the end of the pipe, toward the edge of the pipe section and overlap that edge so as to maintain the weather protector in position relative to the end of the pipe. Because these tabs are spaced apart from one another, ample exposed pipe surface is available for gripping by a gripping tool without interfering with the weather protector at all.

A preferred embodiment of the weather protector according to the invention comprises having a generally circular inner portion and an array of spaced peripheral tabs integral with the inner circular portion and extending radially outwardly therefrom. These tabs include a set of circumferentially spaced long tabs and, interposed between each long tab and its neighbouring long tab, a series of closely space short tabs. The short tabs are spaced from one another, and those adjacent the long tabs are spaced from the long tabs, by narrow radial gaps or recesses. Installed, the tabs are folded toward the pipe end along a circular fold line thereby to form a rim for contacting the inner cylindrical surface of the pipe. The distal ends of the long tabs are folded over the pipe end along transverse fold lines substantially coincident with the pipe end edges. The distance between the transverse fold lines on the long tabs and the common circular fold line defines the extent of recessed spacing of the weather protector within the interior of the pipe. This spacing should be sufficient to enable a pipe-gripping tool to handle the pipe without encountering any of the tabs. The distal ends of the long tabs folded over the outer cylindrical surface of the pipe inhibit further movement of the weather protector into the interior of the pipe.

DETAILED DESCRIPTION WITH REFERENCE TO THE DRAWINGS

Figure 1:
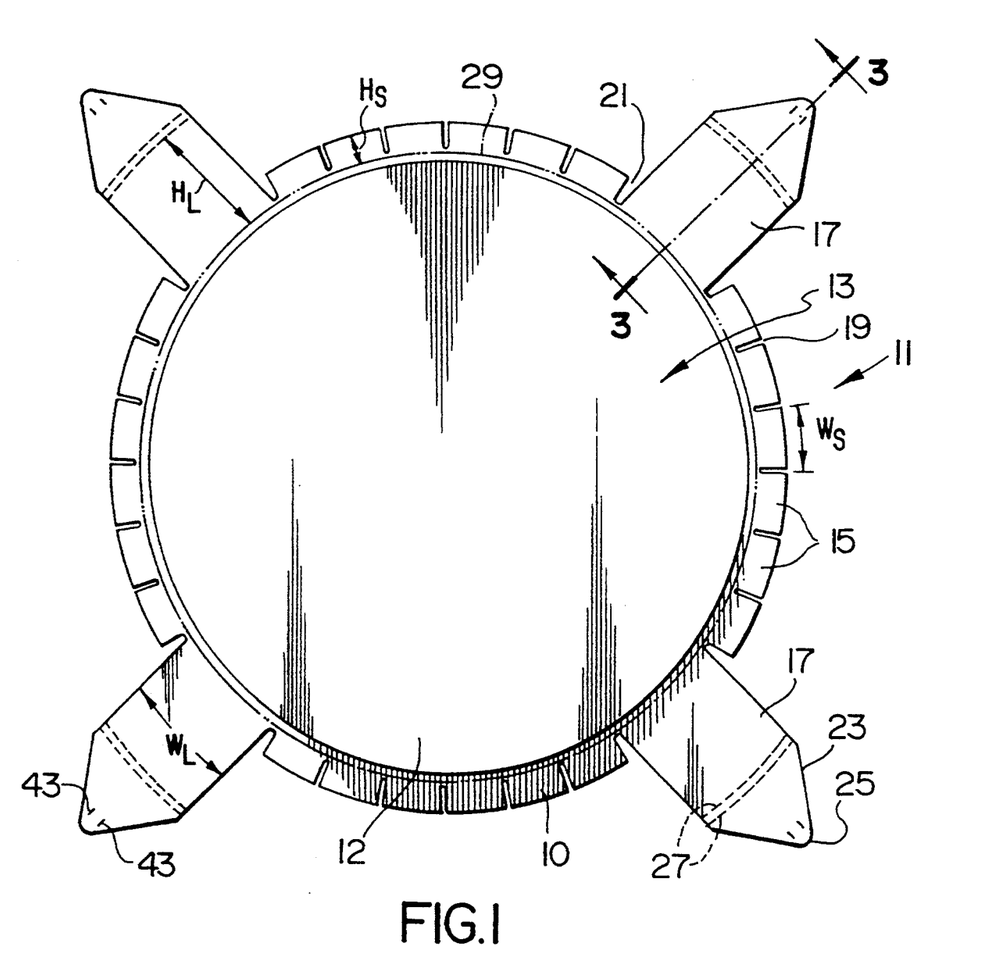
FIG. 1 is a plan view of a stamping of a single sheet of stiff material that can be folded to form a preferred embodiment of the pipe-end weather protector in accordance with the present invention, together with an optional water-repellant layer laminated thereto.

The pipe-end weather protector according to the invention is preferably made by stamping or cutting a sheet of stiff disposable biodegradable material such as cardboard to form a blank and then folding it to forth the weather protector. A blank suitable to this purpose is illustrated in FIG. 1.

The weather protector, generally indicated as 11, comprises a blank 10 having an inner circular portion whose periphery comprises integral extensions of the blank extending radially outwardly as a series of spaced tabs of two different types. Short tabs 15, of which a representative twenty-four are illustrated in FIG. 1, are closely spaced together over the greater portion of the periphery of the blank 10, but are interrupted periodically by the interposition of a long tab 17. The short tabs 15 are spaced from one another by narrow radial gaps 19. In FIG. 1, four such long tabs 17 are illustrated, each one at 90° to the nearest identical such tab 17 (but the number of such tabs 17 and their spacing is to a certain degree arbitrary). Each tab 17 is provided with arcuate fold lines 27 that facilitate the folding of end portions 23 of tabs 17 over the end of the pipe, as seen in FIG. 2.

The distal end 23 of each of the long tabs 17 may be tapered inwardly distally beyond fold lines 27 to reach a blunt point 25. Tabs 17 are spaced from adjacent short tabs 15 by radial gaps 21.

Figure 2:
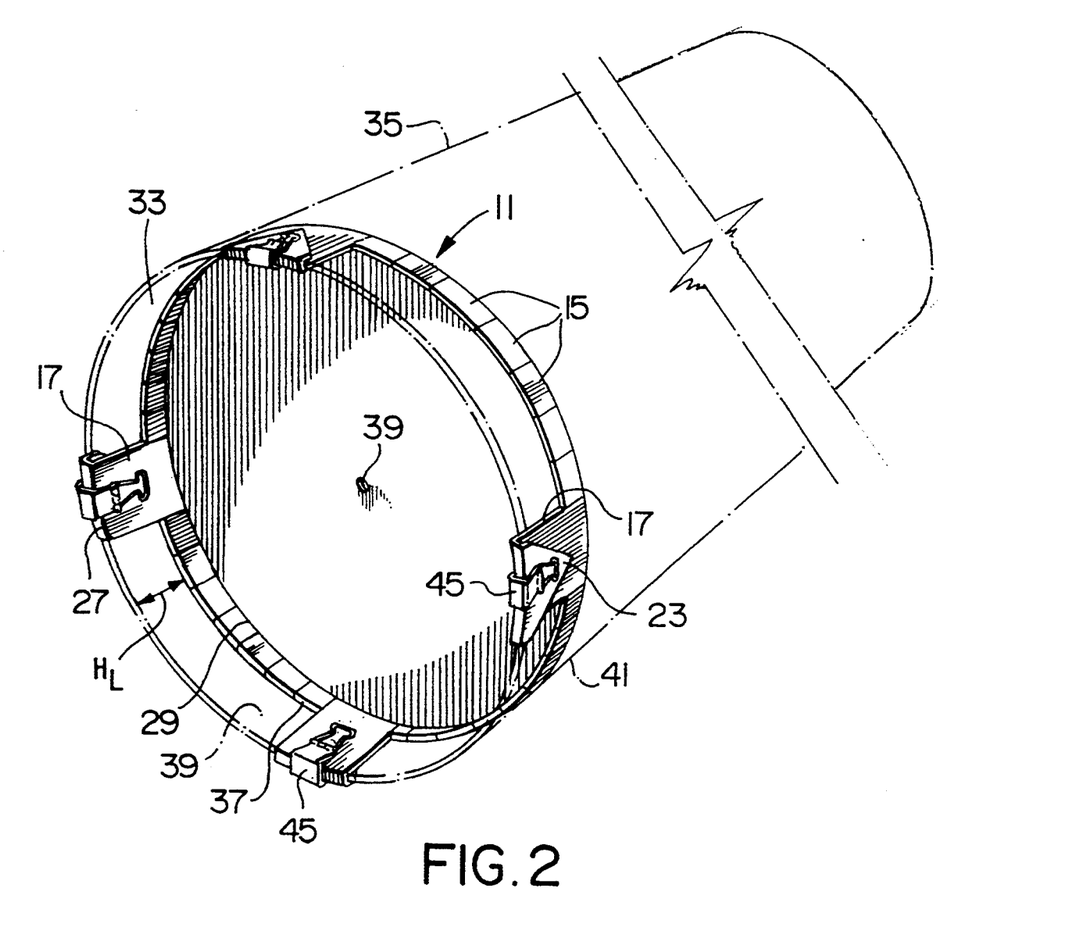
FIG. 2 is a perspective view of a preferred embodiment of a pipe-end weather protector according to the present invention, shown installed in place at the end of a pipe section (shown in phantom), and made by folding the blank of FIG. 1.

The long tabs 17 have the purpose of wrapping around the end of the pipe to establish the interior position of the weather protector 11 within the pipe to be protected as seen in FIG. 2. For that reason, in order to give stability to the weather protector inset within the pipe end, there should be at least three long tabs 17 present, but there could be more than four. It is desired that a gripping tool be able to grip the pipe in the peripheral spaces between the tabs 17 and consequently, the number of tabs 17 is preferably small, and the spacing between them is preferably large. Further, the dimensions of each tab 17, while being large enough to provide adequate structural strength to the weather protector, should preferably for other reasons be fairly narrow in a circumferential direction, so as not to interfere unduly with the gripping of the pipe by pipe-gripping machinery, and so that the fold over the end of the pipe (to be illustrated with reference to FIG. 2) does not result in the side edges of tabs 17, as they are bent over the end of the pipe, leaving large gaps between the pipe and the underside of the folded-over portion of each tab 17 that could be caught by an interfering object and thereby torn.

As mentioned, the space between any two neighbouring tabs 17 occupied by the shorter tabs 15 should be relatively large. The tabs 15 and 17 must be folded to form the peripheral wall of the weather protector 11 that engages the interior cylindrical surface of the pipe to be protected, as is illustrated in FIG. 2. Consequently, the individual tabs 15 should be relatively closely spaced so that when folded in place as illustrated in FIG. 2, they form an approximation of arcuate portions of a continuous narrow cylindrical rim for the weather protector 11. Since it is desired that the tabs 15 make fairly close contact with the interior cylindrical wall of the pipe to be protected, their width $W_s$ measured in a circumferential direction should be sufficiently small that a good tight fit against the interior cylindrical wall of the pipe is obtained.

A circular fold line 29 permits the tabs 15, 17 to be folded through approximately 90° to form the weather protector of FIG. 2. The fold line 29 is at the troughs or inset radially from the troughs of the gaps 21 by a short distance, to permit folding of the entirety of each of the tabs 15, 17 about a common circle.

The height $H_s$ of each of the short tabs 15 from the circular fold line 29 is somewhat arbitrary, but should be appreciably less than the distance $H_L$ between fold line 29 and the long tab fold lines 27 for each of the long tabs 17. This is to enable the short tabs 15, when the weather protector 11 is inserted in the pipe, to protrude towards the pipe end only a relatively small distance, leaving ample interior space between the end of the pipe and the distal ends of short tabs 15 so that pipe gripping equipment will not engage the short tabs 15 when gripping the pipe. It is apparent that the distance $H_L$ establishes the distance between the end of the pipe and the interior position within the pipe of the weather protector 11 as will be evident from an inspection of FIG. 2.

Figure 3:
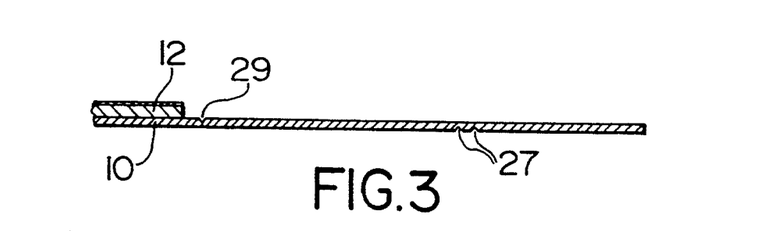
FIG. 3 is a partial elevation view of the blank and laminated layer of FIG. 1 taken along line 3—3 in FIG. 1, showing a long tab and adjoining portion of the stamping.

The fold lines 27 and 29 are preferably stamped as indented weakened portions of the sheet material from which the blank 11 has been cut, as is conventional (see FIG. 3).

The weather protector 11 can be made from a single sheet of material and used in that form, but may preferably also include a superimposed disk 12 laminated onto the blank 10 and inset from the circular fold line 29 by a very short distance. The disk 12 forms the weather side of the weather protector 11 when installed in the pipe. For this purpose, the disk 12 is made of water-repellant material or has a water-repellant surface. In either case, a biodegradable material is preferred. The addition of a further sheet of material in the form of disk 12 overlapping the underlying stamping 11 tends to add some structural strength to the weather protector 11, and is more resistant to rain and wet snow than would be a single sheet of untreated cardboard (say). If the disk 12 is made of cardboard, then for reasons of strength its flutings should be oriented approximately at right angles to the flutings of the blank 10.

Referring now to FIG. 2, it can be seen that the weather protector 11 is positioned in place inset from the pipe end 33 of a pipe section 35 by the distance $H_L$, being the distance between circular fold line 29 and fold lines 27 on tabs 17. The tabs 17 have been folded over so that the only portion projecting on the exterior of the pipe is the tapered end portion 23. The tapering of the distal portion 23 of the long tab 17 tends to reduce wind drag on the pipes when they are loaded on railway cars or trailers for transportation (with the weather protectors installed).

It can be seen from FIG. 2 that the short interior tabs 15 have been folded outwardly in the same direction as the long tab 17 to form a rim portion 37 for the pipe protector 11. The rim 37 bears tightly against the interior cylindrical wall 39 of pipe 35 and, together with the tabs 17, tends to maintain the weather protector 11 firmly in place within the pipe end 33. Obviously to make this possible, the radius of the interior circular portion 13 (roughly coincident with disk 12 if disk 12 is present) of blank 11 from the centre of the circle to fold line 29, should be coincident with or even slightly greater than the interior radius of pipe 35.

The pipe protector illustrated in FIG. 2 differs slightly from the pipe protector 11 of FIG. 1 in that a central circular hole 39 is shown in the pipe protector of FIG. 2. This optional hole 39 may be provided to eliminate a pressure differential between the interior and exterior of the pipe. Such pressure differential could arise due to temperature changes, wind, etc. The presence of the hole 39 of course does imply that a very small amount of precipitation could conceivably enter via the hole, but as long as the hole dimensions are kept small, this is not likely to be a problem, and the desirability of eliminating the pressure differential tends to be the more important consideration.

The long tabs 17 do not have much structural strength if made of ordinary sheet material such as cardboard; further, the folding of these tabs does not typically deform them sufficiently to enable the folded over distal portion 23 to lie in close contact with the exterior surface 41 of pipe 35. For that reason, it may be desirable to have some auxiliary external means to keep the tabs 17 tightly folded over the pipe end. This can be accomplished by having a strap or string (not shown) extend around the periphery of pipe end 33 and overlap the folded-over portions 23 of tabs 17. The string or strapping may pass through slots 43 provided in distal portions 23 of tabs 17. Alternatively, as illustrated in FIG. 2, conventional office spring clips 45 can be used to keep the long tabs 17 tightly folded over and in place against the pipe end 33. The need for these clips or strapping or the like is paramount during transportation of the pipe, but may not be necessary while the pipes are lying in the field awaiting to be welded together prior to burial. The office clips can easily be removed and reused for the same or other purposes.

FIG. 3 is a partial section view taken along the line 3—3 in FIG. 1 illustrating the indentation or weakening of the fold lines 29 and 27 and illustrating the laminated structure of the weather protector 11, showing superposed water repellant circular disk 12 bonded to the underlying stamping 10. However, as mentioned, this disk 12 is not necessary to the invention—a single stamping 11 could be used without a superposed disk, in which case the surface of the weather protector 11 facing the exterior (and accordingly the ravages of weather) could preferably be given a water repellant coating—this could be done by spraying the weather protector once it is in place on the pipe end, for example.

Although the shape, configuration, number and spacing of the tabs, fold lines, etc. are within the designer's discretion and may well depend to some extent upon such factors as the diameter of the pipe to be protected against the weather and the particular pipe-gripping tool used, nevertheless, some guidelines can be given. Some guidelines have been stated already.

Further, the gaps between adjacent tabs should be sufficient to enable the tabs 15 when they are folded 90° to the plane of the blank so as to be inserted in the pipe end, to form a substantially contiguous, complete, annular rim 37 in contact with the interior cylindrical surface of the pipe section. This use of a series of closely spaced, but separate peripheral tabs around the edge of a circle, is of course a commonplace design technique and has appeared in various prior designs for objects to be inserted in pipes—see for example U.S. Pat. No. 4,630,646 (Koehle - 23 Dec., 1986). The object here (as distinguished in this respect from Koehle) is to provide enough space between adjacent tabs to permit them to be folded easily into position, but not enough space to provide any appreciable gap between adjacent tabs when they have been folded into position. Note that a somewhat wider gap may be desirable on either side of the longer tabs so that there is no risk that the side edges of these tabs will be distorted out of position.

The choice of blank pattern and dimensions is of course arbitrary to some extent and will vary depending upon inner and outer pipe diameter. Furthermore, the economics of forming a blank govern to some extent. Note that the blank of FIG. 1 can be formed from a square sheet of cardboard whose corners are roughly coincident with the blunt pointed ends 25 of the long tabs 17, with little material waste. However, for very large pipe diameters, six or more long tabs might be suitable instead of the four long tabs illustrated in FIG. 1.

The following example is illustrative:

EXAMPLE

The following dimensions were found to be suitable for a weather protector for a representative forty-two inch diameter pipe section:
- number of short tabs: twenty-four, in four groups of six (as shown in FIG. 1);
- number of long tabs: four spaced at 90° to one another, as shown in FIG. 1;
- width of short tabs: approximately four inches;
- height of short tabs above circular fold line: approximately two inches;
- width of long tabs: approximately eight inches;
- distance between common circular fold line and foldover position of long tabs: approximately eight inches (the two fold lines for facilitating the foldover of the end portion of the long tabs may be separated from one another by about one-half inch for a pipe wall of that thickness); the foregoing implies that when in position within the pipe end, the weather barrier will be recessed from the pipe end by approximately eight inches;
- length of folded-over portion of long tab from distally most remote fold line to blunt tapered point: approximately five inches.

What is claimed is:

1. A pre-cut blank of relatively stiff sheet material for making a weather protector for insertion by a predetermined distance into the end of a pipe having a predetermined inner diameter, comprising a generally circular inner portion whose diameter is selected to match the inner diameter of the pipe, and an array of spaced tabs integral with the inner circular portion and extending radially outward therefrom, the tabs including a set of circumferentially spaced long tabs and, interposed between each long tab and its neighbouring long tab, a series of closely circumferentially spaced short tabs, the short tabs adjacent the long tabs being spaced from the long tabs by narrow radial gaps, and the short tabs being spaced from one another by narrow radial gaps, said long tabs having a length corresponding to said predetermined insertion distance.

2. A blank as defined in claim 1 wherein a weakened fold line is provided in the form of a circle in the vicinity of the troughs of the gaps between adjacent tabs.

3. A blank as defined in claim 2, made of cardboard.

4. A blank as defined in claim 3, additionally comprising a water-repellant coating or layer on one side of the blank and occupying substantially all of the area interior to the circle defined by the fold line.

5. A blank as defined in claim 1 comprising at least three of said long tabs spaced generally equally from one another about the circumference of the fold line.

6. A blank as defined in claim 5, comprising four said long tabs oriented at 90° intervals about the circular inner portion.

7. A blank as defined in claim 5, wherein the short tabs are substantially identical and equally numbered and spaced between neighbouring long tabs, the outer edges of said short tabs lying on a common circle.

8. A blank as defined in claim 5 bonded to a generally circular disk slightly inset of the tabs and having an exterior water repellant surface.

9. A blank as defined in claim 5, made of biodegradable material.

10. A weather protector for the end of a pipe having an inner cylindrical surface of predetermined inner diameter with an edge, comprising a pre-cut blank of relatively stiff sheet material having a generally circular inner portion whose diameter is selected to match the inner diameter of the pipe, and an array of spaced tabs integral with the circular inner portion and extending radially outward therefrom, the tabs including a set of circumferentially spaced long tabs each having a pair of transversely weakened fold line; and interposed between each long tab and its neighbouring long tab, a series of circumferentially closely spaced short tabs, the short tabs being spaced from one another by arrow radial gaps, and those of the short tabs adjacent the long tabs being spaced from the long tabs by narrow radial gaps; the blank having a weakened fold line in the form of a circle in the vicinity of the troughs of the gaps; wherein the tabs are folded in the same direction relative to the plane of the blank along the circular fold line thereby to form a rim for contacting the inner cylindrical surface of the pipe; the distal ends of the long tabs being folded over the pipe-end with the transverse fold lines of the long tabs being substantially coincident with the pipe-end edge so that the distance between the transverse fold lines on the long tabs and the circular fold line defines the extent of recessed spacing of the weather protector within the interior of the pipe, the foldover of the distal ends of the long tabs over the outer cylindrical surface of the pipe thereby inhibiting further movement of the weather protector into the interior of the pipe thereby to maintain the weather protector in position at the end of the pipe.

11. A weather protector as defined in claim 10, wherein the pair of closely spaced transverse fold lines of each of said long tabs are spaced apart by approximately the thickness of the wall of the pipe, and wherein the distance between the innermost such fold line and the circular fold line is greater than the height of the short tabs by an amount sufficient to permit a gripping element for the pipe to grip the edge of the pipe end without encountering any of the short tabs.

12. A weather protector as defined in claim 11, wherein the distal end of each said long tab tapers inwardly to a blunt point.

13. A weather protector as defined in claim 12, wherein the circular fold line is formed on the opposite surface of the blank from the pair of transverse fold lines on each of the long tabs.

14. A weather protector as defined in claim 13, wherein each of the transverse fold lines on each of the long tabs is shaped as an arc of a circle whose centre is the same as the centre of the said inner circular portion of the blank.

15. A weather protector as defined in claim 11 in combination with retaining elements for retaining the distal ends of the long tabs in contact with the outer cylindrical surface of the pipe end.

16. A weather protector as defined in claim 15, provided with a small aperture for relieving pressure differentials between the interior and exterior of the pipe.

17. A weather protector as defined in claim 15, made of biodegradable material.

18. A weather protector as defined in claim 17, wherein the width of the long tabs is greater than the width of the short tabs for the purpose of providing sufficient strength of the long tabs to maintain the weather protector in place within the interior of a pipe section.

19. A weather protector as defined in claim 18, wherein the recesses between adjacent tabs are selected to permit the tabs to be folded toward the outer edge of the pipe into contact with the interior wall surface of the pipe thereby to form a generally cylindrically shaped rim for engaging the interior cylindrical surface of the pipe, 20. A weather protector as defined in claim 19, additionally comprising a waterproof layer on one side thereof occupying substantially all of the area interior to the circle defined by the circular fold line.

21. A weather protector as defined in claim 19, comprising at least three long tabs spaced generally equally from one another about the circumference of the circular fold line.

22. A weather protector as defined in claim 21 comprising four said long tabs oriented at 90° intervals about the circular inner portion.

23. A weather protector as defined in claim 21, wherein the short tabs are substantially identical and equally spaced between neighbouring long tabs, the outer edges of said short tabs lying on a common circle.

24. A weather protector as defined in claim 21, made of biodegradable material.

25. A weather protector for insertion for a predetermined distance into the end of a pipe of predetermined inner diameter, comprising:
   a pre-cut blank of relatively stiff sheet material having a generally circular inner portion of a diameter corresponding to said pipe inner diameter and an array of first circumferentially separated short tabs integral with the circular inner portion and extending radially outward therefrom, said blank also including means for limiting the insertion of said blank into said pipe, said limiting means including a set of circumferentially spaced second long tabs extending integrally and radially from said circular inner portion, and interspersed among said array of short tabs, said second long tabs having a length greater than the length of said first short tabs and corresponding to said predetermined insertion distance.

26. A method of producing a weather protector for insertion for a predetermined distance within the end of a pipe section of predetermined inner diameter comprising providing a pre-cut blank of relatively stiff material; said blank comprising a generally circular inner portion and an array of spaced tabs integral with said circular inner portion and extending radially outward therefrom, said circular portion having a diameter substantially equal to said inner diameter of the pipe to which said protector is to be applied, said tabs including a first set of circumferentially spaced first tabs and a second set of circumferentially spaced second tabs, each of said second tabs being interspersed among tabs of said first set, said second tabs having a radial length greater than said predetermined insertion distance and greater than that of said first tabs.

27. A method of protecting the end of a pipe having a predetermined inner diameter comprising the steps of providing a protector formed from a blank of relatively stiff weather resistant material, said blank comprising a generally circular inner portion and an array of circumferentially spaced tabs integral with said circular inner portion and extending radially outward therefrom, said tabs including a first set of circumferentially spaced first short tabs and a second set of circumferentially spaced second long tabs, each of said second long tabs being interspersed among tabs of said first set, said second tabs having a radial length greater than that of said first tabs, bending said tabs to an angle relative to the plane of said inner portion so that said first tabs form a rim conforming to said inner diameter, and inserting said protector within the end of the pipe such that the ends of said first short tabs are spaced from the end of said pipe by a predetermined distance, and folding the distal ends of the long tabs over the edge of the pipe whereby said second long tabs extend to and overlap the edge of said pipe.

28. In combination (i) a pipe section having a predetermined inner diameter and an open end adapted to be gripped by a gripping element and (ii) a weather protector formed from a blank, said blank comprising a generally circular inner portion and an array of spaced tabs integral with said circular inner portion and extending radially outward therefrom, said tabs including a first set of circumferentially spaced first short tabs and a second set of circumferentially spaced second long tabs, each of said second long tabs being interspersed among the short tabs of said first set, said second long tabs having a radial length greater than that of said first short tabs, said protector being within said pipe at a distance from the pipe end such that said second long tabs extend to and overlap the open end of said pipe and said first short tabs are entirely within the pipe, whereby the gripping element is enabled to grip the edge of the pipe between adjacent ones of said second long tabs without encountering any of said first short tabs or second long tabs.

* * * * *

UNITED STATES PATENT AND TRADEMARK OFFICE
CERTIFICATE OF CORRECTION

Page 1 of 4

PATENT NO. : 5,337,792
DATED : 16 August, 1994
INVENTOR(S) : Lorne F. Tempel

It is certified that error appears in the above-indentified patent and that said Letters Patent is hereby corrected as shown below:

Title page, item [57], col. 2,
In the Abstract, line 8, change "or" to --of--.

Col. 1, line 18, change "client" to --climate--.

Col. 2, line 61, change "space" to --spaced--.

Col. 3, line 33, change "forth" to --form--.

Col. 7, line 1, change "A" to --For use with a pipe section having a predetermined inner diameter, a.--.

Col. 7, lines 3-5, change "a pipe having a predetermined inner diameter" to --the pipe section--.

Col. 7, line 6, change "," to --section--.

UNITED STATES PATENT AND TRADEMARK OFFICE
CERTIFICATE OF CORRECTION

PATENT NO. : 5,337,792
DATED : 16 August, 1994
INVENTOR(S) : Lorne F. Tempel

It is certified that error appears in the above-indentified patent and that said Letters Patent is hereby corrected as shown below:

Col. 7, line 40, change "A" to --In combination, a pipe section having an inner cylindrical surface of predetermined inner diameter and a--.

Col. 7, lines 40-42, change "a pipe having an inner cylindrical surface of predetermined inner diameter with an edge" to --the pipe section--.

Col. 7, line 42, before "comprising" insert --said weather protector--.

Col. 7, line 45, delete "," and insert --section--.

UNITED STATES PATENT AND TRADEMARK OFFICE
CERTIFICATE OF CORRECTION

PATENT NO. : 5,337,792
DATED : 16 August, 1994
INVENTOR(S) : Lorne F. Tempel

It is certified that error appears in the above-indentified patent and that said Letters Patent is hereby corrected as shown below:

Col. 8, line 46, change "," to --.--.

Col. 8, line 64, change "A" to --For use with a pipe of predetermined inner diameter, a--.

Col. 8, lines 65-66, change "a pipe of predetermined inner diameter" to --the pipe--.

Col. 8, line 66, insert before " comprising" --said weather protector--.

Col. 9, line 14, change "producing a" to --providing--.

Col. 9, line 14, change "protector" to --protection--.

UNITED STATES PATENT AND TRADEMARK OFFICE
CERTIFICATE OF CORRECTION

PATENT NO. : 5,337,792
DATED : 16 August, 1994
INVENTOR(S) : Lorne F. Tempel

It is certified that error appears in the above-indentified patent and that said Letters Patent is hereby corrected as shown below:

Col. 9, line 15, delete "insertion for a predetermined distance within".

Col. 9, lines 22-23, change "to which said protector is to be applied" to -- section to be protected--.

Col. 10, line 9, before "such" insert -- a distance selected to enable a pipe-gripping element to grip the edge of the pipe without encountering any of the first short tabs--.

Col. 10, lines 10-11, change "a predetermined" to --said--.

Col. 10, line 27, before "within" insert --inserted--.

Signed and Sealed this

Seventh Day of March, 1995

*Attest:*

BRUCE LEHMAN

*Attesting Officer*  *Commissioner of Patents and Trademarks*